United States Patent
Lopez et al.

(10) Patent No.: US 8,985,950 B2
(45) Date of Patent: Mar. 24, 2015

(54) LEAD-LAG DAMPER DEVICE TO LIMIT AN END-OF-STROKE FORCE PEAK

(75) Inventors: Cédric Lopez, Chateauneuf les Marigues (FR); Benjamin Talon, Cahors (FR)

(73) Assignee: Airbus Helicopters, Marignane Cedex (FR)

( * ) Notice: Subject to any disclaimer, the term of this patent is extended or adjusted under 35 U.S.C. 154(b) by 590 days.

(21) Appl. No.: 13/357,897

(22) Filed: Jan. 25, 2012

(65) Prior Publication Data
US 2012/0195760 A1 Aug. 2, 2012

(30) Foreign Application Priority Data
Jan. 31, 2011 (FR) ...................................... 11 00285

(51) Int. Cl.
*B64C 27/51* (2006.01)
*F16F 9/20* (2006.01)
*F16F 9/49* (2006.01)

(52) U.S. Cl.
CPC . *F16F 9/20* (2013.01); *B64C 27/51* (2013.01); *F16F 9/49* (2013.01)
USPC ........................................................ 416/106

(58) Field of Classification Search
CPC ........................................................ B64C 27/51
USPC ............ 416/106, 107, 134 A, 140, 141, 500; 29/899.1; 188/378, 379, 380; 267/136, 267/140.11
See application file for complete search history.

(56) References Cited

U.S. PATENT DOCUMENTS

| | | | | |
|---|---|---|---|---|
| 3,803,983 A | * | 4/1974 | Amtsberg | ........................ 91/227 |
| 3,972,396 A | * | 8/1976 | Bochnak | ........................ 188/312 |
| 4,503,951 A | * | 3/1985 | Imaizumi | ........................ 188/280 |
| 5,347,771 A | | 9/1994 | Kobori | |
| 5,501,434 A | * | 3/1996 | McGuire | .................. 267/140.11 |
| 5,517,898 A | | 5/1996 | Kim | |
| 6,454,206 B2 | * | 9/2002 | Vincent | ...................... 244/17.27 |

(Continued)

FOREIGN PATENT DOCUMENTS

| | | |
|---|---|---|
| EP | 1659309 A1 | 5/2006 |
| FR | 1292739 A | 5/1962 |
| NL | 9202218 A | 7/1994 |

OTHER PUBLICATIONS

Search Report and Written Opinion; Application No. FR 1100285; dated Sep. 21, 2011.

*Primary Examiner* — Nathaniel Wiehe
*Assistant Examiner* — Kayla McCaffrey
(74) *Attorney, Agent, or Firm* — Brooks Kushman P.C.

(57) ABSTRACT

Damper device for damping relative movements of two elements of a mechanical system. The damper device comprises a damping chamber filled with a hydraulic fluid, a rod (4) having a piston (3) movable in the damping chamber so as to define two hydraulic compartments (1, 2), at least one calibrated orifice (10) provided in the piston (3) for throttling the hydraulic fluid flowing from one hydraulic compartment (1, 2) to another hydraulic compartment, at least one compression peak-limiting valve (11) and a traction peak-limiting valve (12), throttling the hydraulic fluid flowing from one hydraulic compartment (1, 2) to another hydraulic compartment. The damper has additional hydraulic means that are active in compression and in traction when the piston (3) reaches the end of its stroke, so as to constitute a progressive hydraulic abutment damping the end-of-stroke jolts.

11 Claims, 3 Drawing Sheets

(56) References Cited

U.S. PATENT DOCUMENTS

| | | |
|---|---|---|
| 7,314,124 B2 | 1/2008 | Martyn |
| 7,353,922 B2 * | 4/2008 | Furuya et al. .................. 188/284 |
| 8,764,396 B2 * | 7/2014 | Stamps et al. ................ 416/107 |

* cited by examiner

LEAD-LAG DAMPER DEVICE TO LIMIT AN END-OF-STROKE FORCE PEAK

CROSS REFERENCE TO RELATED APPLICATIONS

The present invention claims priority to French application no. FR 11/00285, the disclosure of which is incorporated in its entirety by reference herein.

BACKGROUND OF THE INVENTION (1) Field of the Invention

The invention relates to the general field of mechanics and hydraulics.

The invention relates to damping a mechanical system and more particularly to equipment including damper systems used in aviation.

(2) Description of Related Art

The invention is applicable in any damping system, and especially in lead-lag dampers used on a main rotor of a rotorcraft, and in particular of a helicopter.

By way of example, on a "soft-in-plane" helicopter rotor, a lead-lag damper system connects each blade to the hub of said rotor or interconnects two consecutive blades. Such dampers are also fitted of necessity to rotors of the "stiff-in-plane" type, but they are subjected to less stress than in soft-in-plane rotors.

Such a damper makes it possible to avoid catastrophic coupling between the lead-lag movements of the blades and the airframe of the helicopter. Such phenomena are known as "ground resonance" and "air resonance".

Such a damper is subjected to forced movements at the frequency of rotation of the rotor, due to the pitch movements and the flapping movements of said blade, and also to the lead-lag movements of the blade. The damper influences those movements to only a very small extent.

The damper is also subjected to movements at the specific lead-lag frequency of the blade.

These movements are not damped naturally, e.g. by aerodynamic forces. The damper therefore acts to oppose any resonance phenomenon.

Damping the lead-lag movement of the blades, with a view to guaranteeing stability for the helicopter, makes it possible to prevent the ground resonance and air resonance phenomena.

In order to generate an appropriate damping relationship, it is known to use particular dampers. Such dampers are, in general, based on a relationship that is characteristic of force as a function of dynamic movement of the damper, which relationship has three distinct damping ranges depending on the dynamic movement stress to which they are subjected. Such a relationship may be referred to as a relationship of the "triple slope" type.

Document EP 1 659 309 describes a hydraulic damper for lead-lag damping of the blades of a helicopter, that damper having hydraulic constrictions formed by calibrated orifices and by hydraulic peak-limiting valves so as to generate a damping relationship of the "triple slope" type, as presented above. The damper described in that document also has an end-of-stroke abutment made of elastomer. Unfortunately, that damper suffers from drawbacks. The presence of a mechanical abutment made of elastomer does not make it possible to avoid the occurrence of peaks of force resulting from end-of-stroke jolting of the damper. It should also be emphasized that it is difficult to adjust the peak-limiting valves. The damper needs to be removed in order to perform such adjustment, and then refitted.

Document FR 1 292 739 describes a hydraulic damper device. A base of a piston fits the bore of a throat of a cylinder, while a ring is movable axially.

Document U.S. Pat. No. 5,347,771 describes an anti-earthquake safety system, with a high-damping damper device provided with a piston. Chambers of that device are hydraulically suitable for being interconnected through the piston.

Document NL 92/02218 describes a perforated damper piston mounted to slide in a cylinder, with an arrangement integrated into the piston that, at the end-of-stroke limit, opens up a passage for discharging fluid, which passage is normally closed by sealing means.

Document U.S. Pat. No. 5,517,898 describes a pneumatic cylinder that uses damping ("cushioning") chambers, quick fluid exhaust valves, and quick fluid supply valves.

BRIEF SUMMARY OF THE INVENTION

An object of the present invention is therefore to damp a mechanical system while not generating an end-of-stroke force peak in a damper device.

An object of the present invention is more particularly to damp a mechanical system while not generating an end-of-stroke force peak in a lead-lag damper device.

An object of the present invention is to provide a novel damper device that is totally mechanical, that is robust and reliable, and that complies with aviation standards.

Another object of the invention is to provide a novel damper device of compactness enabling it to be incorporated onto the main rotor of a rotorcraft.

Another object of the present invention is to propose a novel damper device that is simple and that makes it possible to reduce manufacturing costs.

Another object of the present invention is, in particular, to provide a novel damper device for which maintenance operations are facilitated.

The objects assigned to the invention are achieved by means of a damper device defined by the claims for damping the relative movements of two elements of a mechanical system. This device comprises:

a damping chamber filled with a hydraulic fluid and secured mechanically to one of the elements;

a rod connected to the other of the elements and having a piston received and movable in the damping chamber in such manner as to define two hydraulic compartments;

at least one calibrated orifice, provided in the piston for throttling the hydraulic fluid flowing from one hydraulic compartment to another hydraulic compartment while the piston is working in traction or in compression; and at least one compression hydraulic peak-limiting valve and at least one traction hydraulic peak-limiting valve, throttling the hydraulic fluid flowing from one hydraulic compartment to another hydraulic compartment, as from a determined amplitude of movement of the piston.

This damper device further comprises additional hydraulic means that are active in compression and in traction as soon as the piston reaches the end of its stroke, so as to constitute a progressive hydraulic abutment damping the end-of-stroke jolts of said piston.

The damper device of the invention thus makes it possible to have additional damping at the end of the stroke. The force thus builds up progressively at the end of the stroke by means of this progressive hydraulic abutment.

In addition, the additional hydraulic means comprise, in each end-of-stroke zone of the piston, a ring having radial orifices, said ring being mounted and centered on a cylindrical shoulder projecting into the corresponding hydraulic compartment in such manner as to define between said ring and said shoulder an annular fluid-flow space in fluid communication both with the corresponding hydraulic compartment and also with the corresponding hydraulic peak-limiting valve via the radial orifices, the additional hydraulic means further comprising a recessed end of the piston that comes to surround the ring and to close off the radial orifices progressively, during the end-of-stroke axial movement of said piston.

In an embodiment of the damper device of the invention, the shoulder is formed by an end wall of the corresponding hydraulic compartment.

In an embodiment of the damper device of the invention, said damper device further comprises a compensation chamber filled with air at atmospheric pressure for the purpose of compensating for the variations in the volume of the hydraulic fluid as a function of temperature.

In an embodiment of the damper device of the invention, the compensation chamber is separated from an additional hydraulic chamber by a separator piston mounted to move against a return force from a spring that is received in the compensation chamber, said additional hydraulic chamber being in fluid communication with an adjacent hydraulic compartment of the damping chamber.

In an embodiment of the damper device of the invention, said damper device has a resilient stationary abutment for damping the residual end-of-stroke forces of the piston.

In an embodiment of the damper device of the invention, each hydraulic peak-limiting valve respectively received in a dedicated removable cylinder, inserted into said device, thereby facilitating adjustment of said valves.

Such a cylinder can be easily extracted from the damper device, thereby making the valves easier to replace, to maintain, or to adjust hydraulically on a test bench.

In an embodiment, the damper device of the invention advantageously has a gauge co-operating with the separator piston to give a visual indication on the quantity of hydraulic fluid contained in said device.

In an embodiment, the damper device of the invention has a drain system for draining any leaks of the hydraulic fluid.

In an embodiment, the damper device of the invention has a lubrication system.

In an embodiment, the damper device of the invention constitutes a lead-lag damper for a rotary-wing aircraft.

The objects assigned to the invention are also achieved by means of an aircraft of the rotorcraft type including a main rotor hub that drives blades, a lead-lag damper connecting each blade to the hub or to a consecutive blade, the lead-lag damper being constituted by a damper device as presented above.

The damper device of the invention thus offers the advantage of generating a damping relationship making it possible to guarantee stability for the aircraft against the phenomena of air resonance and of ground resonance, and to avoid occurrence of peaks of force at the end of the stroke of said device.

Another advantage of the damper device of the invention lies in the fact that the desired results are obtained with a hydraulic damper device.

Another advantage of the damper device of the invention lies in the fact that it makes it possible to reduce the unbalance observed on starting up the main rotor on aircraft equipped with lead-lag dampers. On starting up the rotor, the speeds to which the damper rod is subjected are low. Since the damping takes place by fluid-throttling, it is directly proportional to the speed of movement of the damper rod. In known mechanical-abutment dampers, the damping is thus low and the movement of the blades is damped little, thereby generating unbalance, namely displacement of the center of gravity of the rotor head away from the rotor axis causing, in particular, the phenomenon of ground resonance.

With the damper device of the invention, for low speeds of movement of the rod, the device reaches the end of its stroke, and, due to the reduction in the fluid flow section, the progressive hydraulic abutment generates damping, making it possible to attenuate the blade movements generating the unbalance.

BRIEF DESCRIPTION OF THE SEVERAL VIEWS OF THE DRAWINGS

The invention and its advantages appear in more detail from the following description of at least one embodiment or implementation given by way of non-limiting illustration and with reference to the accompanying drawings, in which.

DETAILED DESCRIPTION OF THE INVENTION

Figure 5:
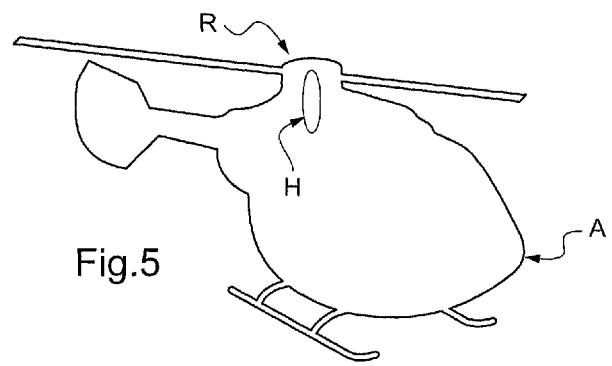
FIG. 5 shows an example of a rotary-wing aircraft of the invention, with a main rotor and a hydraulic damper device.

In FIG. 5, alphanumeric reference A designates a rotary-wing aircraft of the invention, namely a rotorcraft of the helicopter type in FIG. 5. This aircraft A has a main rotor R and at least one hydraulic damper device H of the invention.

Elements that are structurally and functionally identical and that are present in more than one of the figures are given the same numerical or alphanumeric references in each of them.

Figure 1:
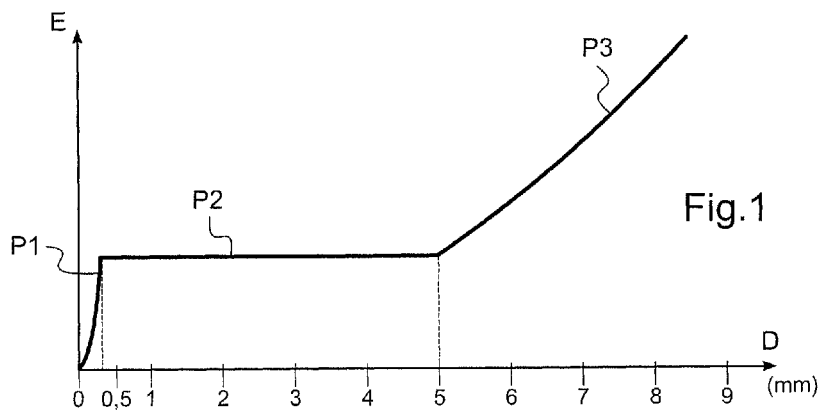
FIG. 1 is an example of a curve having three distinct operating ranges, illustrating the forces to which a lead-lag damper device is subjected as a function of the amplitude of movement of the piston of said damper.

FIG. 1 is an example of a curve having three distinct operating ranges, illustrating the forces E to which a lead-lag damper device is subjected as a function of the amplitude of traction or compression movement D of said damper. FIG. 1 is explained in more detail in the description below.

Figure 2:
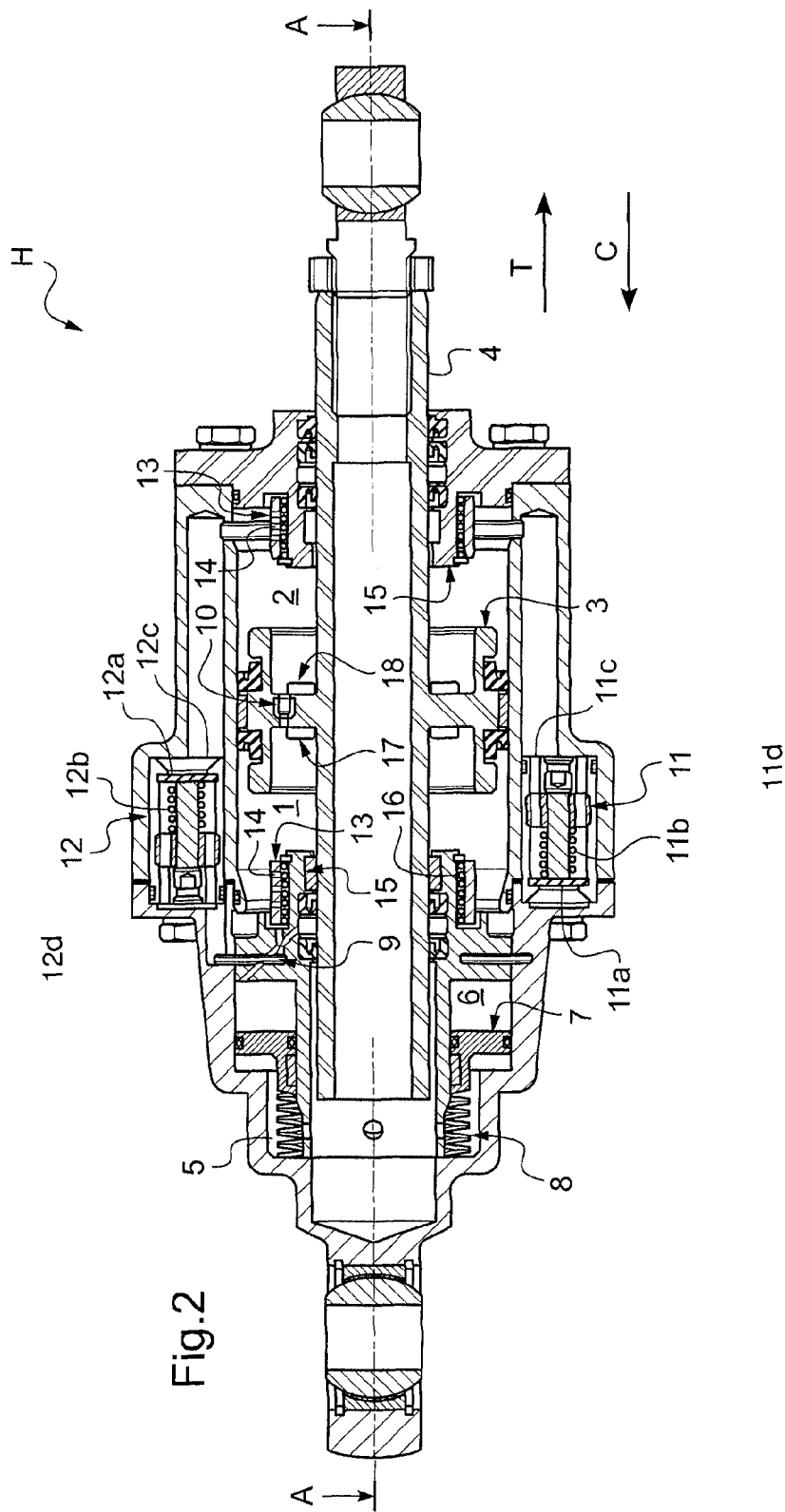
FIG. 2 is a longitudinal section view of an embodiment of a damper device of the invention.

FIG. 2 is a longitudinal section view of an embodiment of a damper device H of the invention.

The damper device includes a hydraulic chamber divided into two working hydraulic compartments 1 and 2 by means of a piston 3 that is part of a rod 4 of the damper device H.

The damper device H also has a compensation chamber 5, filled with air at atmospheric pressure. This compensation chamber 5 is separated from an additional hydraulic chamber 6 by a separator piston 7.

The compensation chamber 5 contains a mechanical spring 8 that compensates for the variations in the volume of oil due to temperature variations by exerting a force on the separator piston 7. For this purpose, the additional hydraulic chamber 6 is directly in fluid communication with an adjacent intermediate hydraulic chamber 9 communicating with the hydraulic compartment 1.

When the damper device H is stressed in traction, the rod 4 connected to the blade is moved in the direction T and compresses the hydraulic fluid in the hydraulic compartment 2. The fluid is thus forced to pass through hydraulic constrictions towards the other hydraulic compartment 1. For dynamic movements D of less than 0.5 millimeters (mm, range corresponding to ground resonance), the hydraulic fluid is throttled through a calibrated orifice 10.

The damper device H also has at least one compression hydraulic peak-limiting valve 11 and at least one traction hydraulic peak-limiting valve 12, throttling the hydraulic fluid flowing from one hydraulic compartment 1, 2 to the other hydraulic compartment 2, 1, as from a determined amplitude of movement of the piston 3.

The traction hydraulic peak-limiting valve remains closed for amplitudes of movement less than 0.5 mm.

The compression hydraulic peak-limiting valve 11, mounted in opposition relative to the traction peak-limiting valve 12, remains closed throughout the stage during which the damper device H is being stressed in traction.

The traction hydraulic peak-limiting valve is opened for dynamic movements D greater than 0.5 mm in such manner as to limit the peak of the damping force E.

The traction hydraulic peak-limiting valve 12 is composed of a closure member 12a that is mounted to be movable axially, and of a spring 12b acting on said closure member 12a. Pre-stressing of the spring 12b sets the peak-limiting threshold for the force E, and an opening section 12c (i.e. the section leaving a passage for fluid) of the closure member 12a determines the damping coefficient.

With the opening action of the closure member, a transient stage starts during which the hydraulic pressure increases. The closure member continues to open until hydraulic saturation is reached for dynamic movements greater than 5 mm.

For movements going beyond 5 mm of dynamic movement D, a stage starts during which the slope is adjusted to obtain a damping coefficient necessary for guaranteeing stability for the aircraft and for avoiding air resonance. This slope is adjusted by the dimensioning of the opening sections, i.e. the hydraulic through sections at the peak-limiting valves 12. These through sections depend on the adjustment of the mechanical abutment acting on the strokes of said valves.

The hydraulic fluid passing through the traction hydraulic peak-limiting valve 12 reaches the intermediate hydraulic chamber 9 that communicates with the hydraulic compartment 1 via a check valve.

When the damper device H is stressed in compression, the rod 4 connected to a blade is moved in the direction C and compresses the hydraulic fluid in the hydraulic compartment 1. The fluid is thus forced to pass through hydraulic constrictions towards the other hydraulic compartment 2.

For dynamic movements D of less than 0.5 mm (range corresponding to ground resonance), the hydraulic fluid is throttled through the calibrated orifice 10.

The compression hydraulic peak-limiting valve is closed for dynamic movements D less than 0.5 mm and the traction hydraulic peak-limiting valve, mounted in opposition, remains closed throughout the stage during which the device is subjected to compression stress.

The compression hydraulic peak-limiting valve is opened for dynamic movements D greater than 0.5 mm in such manner as to limit the peak of the damping force E.

The compression hydraulic peak-limiting valve 11 is composed of a closure member 11a that is mounted to be movable axially, and of a spring 11b acting on the closure member 11a. Pre-stressing of the spring 11b sets the peak-limiting threshold for the force E, and an opening section 11c of the closure member determines the damping coefficient.

After the valve opens in this way, a transient stage starts during which the hydraulic pressure increases and the closure member 11a continues to open until hydraulic saturation is reached for dynamic movements D greater than 5 mm.

Beyond 5 mm of dynamic movement D, a stage starts during which the slope is adjusted to obtain a damping coefficient necessary for guaranteeing stability for the aircraft and for avoiding air resonance. This slope is adjusted by the dimensioning of the hydraulic through sections at the peak-limiting valves 11. These through sections depend on the adjustment of the mechanical abutment acting on the strokes of said valves.

The fluid passing through the compression hydraulic peak-limiting valve 11 reaches the hydraulic compartment 2 directly.

In order to facilitate the hydraulic adjustments and maintenance, in the embodiment of FIG. 2, each of each of the hydraulic peak-limiting valves 11 and 12 is respectively in a dedicated removable cylinder 11d and 12d, respectively, that can easily be inserted into or removed from the damper device H. Thus, the valves can be hydraulically adjusted on a hydraulic test bench completely dissociated from the damper device.

When the movements of the damper device become greater than the allowable movements, and when the end of stroke of the damper is reached, additional hydraulic means referred to as a "progressive hydraulic abutment" generate a progressive damping force that makes it possible to prevent jolts and to attenuate the lead-lag movements of the blades of a rotor R.

In each end-of-stroke zone of the piston 3, the additional hydraulic means have a ring 13 provided with calibrated radial orifices 14. The ring 13 is mounted and centered on a cylindrical shoulder 15 projecting into the corresponding hydraulic compartment 1, 2, so as to define between said ring 13 and said shoulder 15 an annular flow space 16 through which hydraulic fluid can flow. A spring 16a mounted on the cylindrical shoulder 15, makes it possible to hold the ring 13 in a stable axial position, thereby preventing said ring 13 from vibrating due to any stress exerted on it.

This annular flow space 16 is in fluid communication both with the corresponding hydraulic compartment 1, 2 and also with the corresponding hydraulic peak-limiting valve 11, 12 via the radial calibrated orifices 14.

The additional hydraulic means also include a recessed end 3a of the piston 3 that comes to surround the ring 13 and to close off progressively the calibrated radial orifices 14, during the end-of-stroke axial movement of said piston 3.

Figure 4:
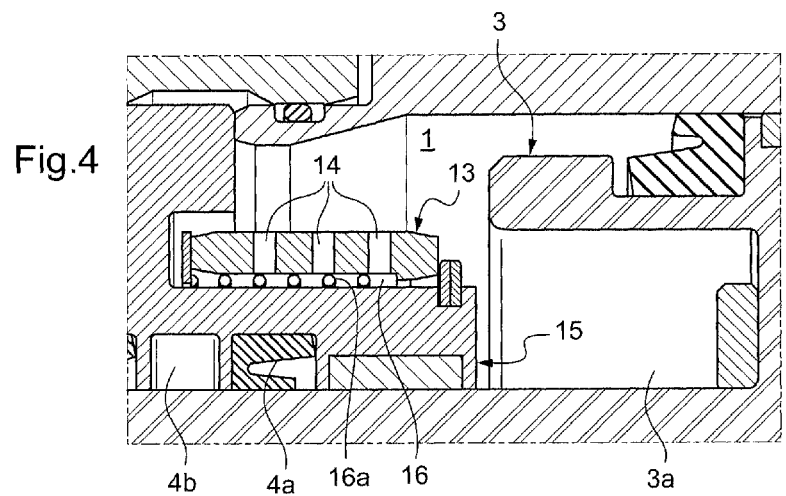
FIG. 4 is an enlarged detail view of the embodiment shown in FIG. 2.

Reference may be made to FIG. 4, which is an enlarged detail view of the embodiment shown in FIG. 2.

The shoulder 15 is optionally formed by an end wall of the corresponding hydraulic compartment 1, 2.

With reference to FIG. 1, it is considered that the rod 4 of the damper device H, which rod is, for example, connected to a blade, compresses a hydraulic fluid and forces it through hydraulic constrictions that procure the damping relationship necessary for the stability of the helicopter A.

The damper device has three damping ranges P1, P2 and P3, depending on the dynamic movement stress D to which it is subjected. These various ranges having different slopes are obtained by varying the overall flow section of the hydraulic constrictions implemented in the damping device.

First throttling through the calibrated orifice 10 generates the damping force E for dynamic movements D of the piston, e.g. movements of less than 0.5 mm. These movements correspond to the first damping range P1 (first slope).

Beyond that, two hydraulic peak-limiting valves 11, 12 working in opposition (one for the compression stage of the device and the other for the traction stage of the device) are disposed in parallel with the calibrated orifice 10 and open for limiting the peak of the force E during dynamic movements D, e.g. movements lying in the range 0.5 mm to 5 mm. These movements correspond to the second damping range P2 (second slope).

For movements greater than 5 mm, the hydraulic peak-limiting valves 11, 12 come into mechanical abutment and cause hydraulic saturation. These movements correspond to the third damping range P3 (third slope).

The relationship governing the damping force E as a function of the dynamic movements D of the damping device is thus shown in FIG. 1.

When the dynamic movements D of the damper device become greater than the allowable movements, and when the end of stroke of said device is reached, the additional hydraulic means referred to as a "progressive hydraulic abutment" generate a progressive damping force that makes it possible to prevent jolts and to attenuate the lead-lag movements of the blades that can induce unbalance on starting up the main rotor.

Constituted, in particular, by the ring 13 having the radial calibrated orifices 14, these additional hydraulic means operate only when the damper device reaches the end of its stroke. For this purpose, the piston 3 of the damper device has a recessed shape 3a that comes to surround the ring 13 and thus to close off progressively the calibrated radial orifices 14 in order to generate a progressive damping force. No peak of force E that might damage the damping device is then generated.

When the rod 4 is subjected to traction stress, if the entire allowable stroke is travelled, the piston 3 continues to push the hydraulic fluid that flows under the ring 13 and that is throttled through the calibrated radial orifices 14. Said calibrated radial orifices are closed off progressively by the piston 3 that comes to surround the ring 13. Thus, a progressive damping force is generated.

When the rod 4 is subjected to compression stress, if the entire allowable stroke is travelled, the piston 3 continues to push the hydraulic fluid that flows under the ring 13 and that is throttled through the calibrated radial orifices 14. Said calibrated radial orifices are closed off progressively by the opposite side of the piston 3 that comes to surround the ring 13.

The progressive hydraulic abutments that are proposed in the damper device of the invention thereby make it possible to procure progressive damping, which is not made possible by the mechanical abutments implemented in known lead-lag dampers.

Figure 3:
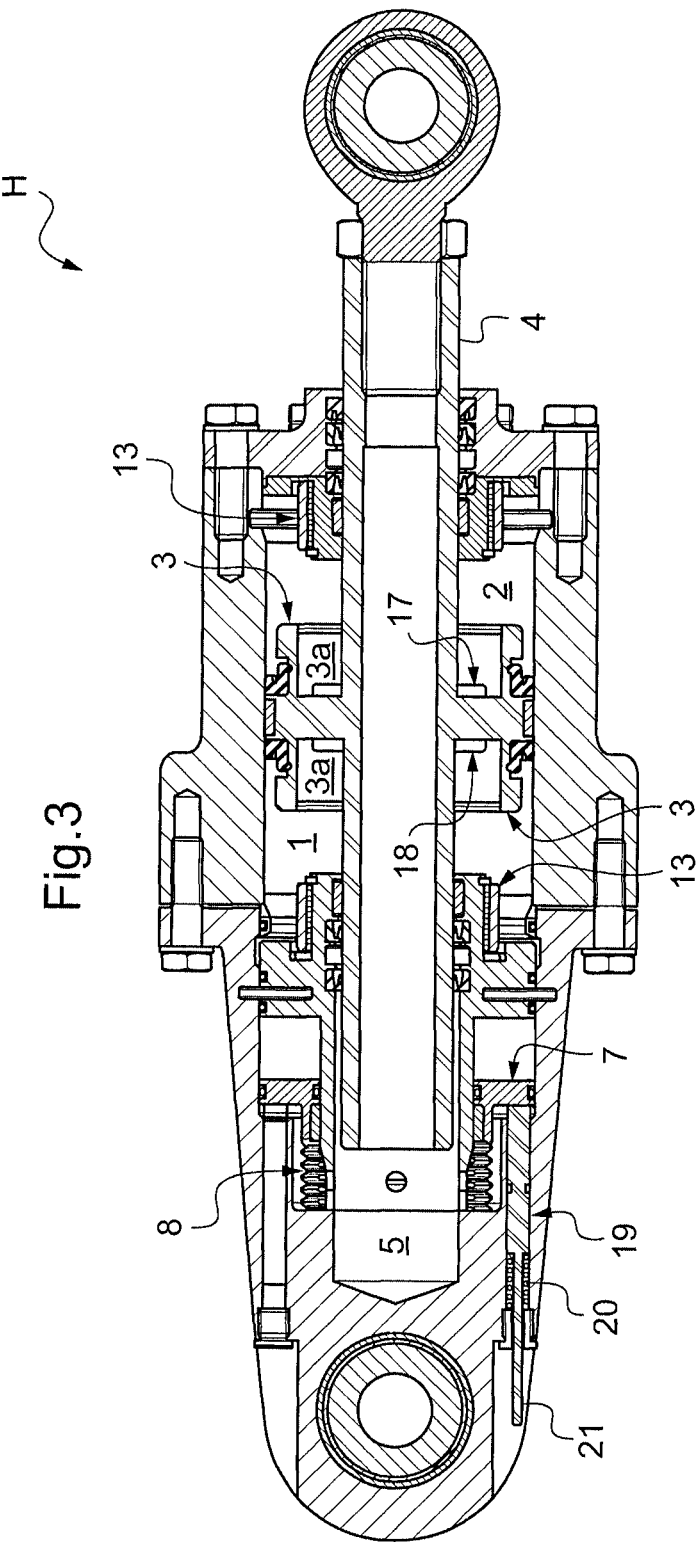
FIG. 3 is a longitudinal section view on A-A of the embodiment shown in FIG. 2.

FIG. 3 is a longitudinal section view on A-A of the embodiment shown in FIG. 2.

Advantageously, and in association with the progressive hydraulic abutment, the damper device of the invention includes resilient stationary abutments 17, 18 for damping the residual end-of-stroke forces of the piston 3. These stationary abutments 17, 18, e.g. made of elastomer, are mounted on the piston 3.

The damper device of the invention advantageously includes a gauge 19 co-operating with the separator piston 7 to give a visual indication on the quantity of hydraulic fluid contained in said device.

In order to determine the position of the separator piston 7, thereby making it possible to obtain information about the volume of hydraulic fluid present in the damper device, the gauge 19 is constituted by a spring 20 that keeps a finger 21 in contact with the separator piston 7. The length of the finger that is visible from the outside indicates the axial position of said separator piston 7.

In an embodiment of the invention, the damper device includes a drain system for draining any leaks of the hydraulic fluid. A hydraulic channel 4b, situated between two gaskets 4a providing sealing at the guides for the rod 4, between the outside and the compensation chamber 5, which gaskets are subjected directly to the pressure, makes it possible, in the event of leakage from the inner gasket 4a, which is the gasket that is subjected to most stress, to drain the hydraulic fluid that is not retained by said defective gaskets towards the intermediate hydraulic chamber 9.

In an embodiment of the invention, the damper device includes a lubrication system. The presence of the hydraulic channel situated between the gaskets makes it possible to obtain lubrication of said gaskets, at the guides for the rod 4, thereby improving operation of said gaskets.

Naturally, the present invention may be subject to numerous variations as to its implementation. Although several embodiments are described, it can readily be understood that it is not conceivable to identify exhaustively all possible embodiments. It is naturally possible to replace any of the means described with equivalent means without going beyond the ambit of the present invention.

What is claimed is:

1. A damper device for damping the relative movements of two elements of a mechanical system, which damper device comprises:
    a damping chamber filled with a hydraulic fluid and secured mechanically to one of the elements;
    a rod connected to the other of the elements and having a piston received and movable in the damping chamber in such manner as to define two hydraulic compartments;
    at least one calibrated orifice, provided in the piston for throttling the hydraulic fluid flowing from one hydraulic compartment to another hydraulic compartment while the piston is working in traction or in compression; and
    at least one compression hydraulic peak-limiting valve and at least one traction hydraulic peak-limiting valve, throttling the hydraulic fluid flowing from one hydraulic compartment to another hydraulic compartment, as from a determined amplitude of movement of the piston;
    wherein said damper device further comprises additional hydraulic means that are active in compression and in traction as soon as the piston reaches the end of its stroke, so as to constitute a progressive hydraulic abutment damping the end-of-stroke jolts of said piston, which additional hydraulic means comprise:
    in each end-of-stroke zone of the piston, a ring having calibrated radial orifices, said ring being mounted and centered on a cylindrical shoulder projecting into the corresponding hydraulic compartment in such manner as to define between said ring and said shoulder an annular fluid-flow space in fluid communication both with the corresponding hydraulic compartment and also with the corresponding hydraulic peak-limiting valve via the calibrated radial orifices; and
    a recessed end of the piston that comes to surround the ring and to close off progressively the calibrated radial orifices, during the end-of-stroke axial movement of said piston.

2. A damper device according to claim 1, wherein the shoulder is formed by an end wall of the corresponding hydraulic compartment.

3. A damper device according to claim 1, wherein the damper device further comprises a compensation chamber filled with air at atmospheric pressure for the purpose of compensating for the variations in the volume of the hydraulic fluid as a function of temperature.

4. A damper device according to claim 3, wherein the compensation chamber is separated from an additional hydraulic chamber by a separator piston mounted to move against a return force from a spring that is received in the compensation chamber, said additional hydraulic chamber being in fluid communication with hydraulic compartment of the damping chamber.

5. A damper device according to claim 4, wherein the damper device has a gauge co-operating with the separator piston to give a visual indication on the quantity of hydraulic fluid contained in said device.

6. A damper device according to claim 1, wherein the damper device has a resilient stationary abutment for damping the residual end-of-stroke forces of the piston.

7. A damper device according to claim 1, wherein each hydraulic peak-limiting valve is respectively received in a dedicated removable cylinder, inserted into said device, thereby facilitating adjustment of said valves.

8. A damper device according to claim 1, wherein the damper device has a drain system for draining any leaks of the hydraulic fluid.

9. A damper device according to claim 1, wherein the damper system has a lubrication system.

10. A damper device according to claim 1, wherein the damper device constitutes a lead-lag damper for a rotary-wing aircraft.

11. An aircraft including a main rotor hub that drives blades, a lead-lag damper connecting each blade to the hub or to a consecutive blade, wherein the lead-lag damper is constituted by a damper device according to claim 1.

* * * * *